United States Patent
Aleksandrovich et al.

(10) Patent No.: US 11,429,561 B2
(45) Date of Patent: Aug. 30, 2022

(54) REPLACING DATABASE TABLE JOIN KEYS WITH INDEX KEYS

(71) Applicant: YAHOO ASSETS LLC, Dulles, VA (US)

(72) Inventors: George Aleksandrovich, Hoffman Estates, IL (US); Allie K. Watfa, Urbana, IL (US); Robin Sahner, Urbana, IL (US); Mike Pippin, Sunnyvale, CA (US)

(73) Assignee: YAHOO ASSETS LLC, Dulles, VA (US)

( * ) Notice: Subject to any disclaimer, the term of this patent is extended or adjusted under 35 U.S.C. 154(b) by 116 days.

(21) Appl. No.: 16/727,060

(22) Filed: Dec. 26, 2019

(65) Prior Publication Data

US 2021/0200715 A1    Jul. 1, 2021

(51) Int. Cl.
*G06F 16/00*        (2019.01)
*G06F 16/13*        (2019.01)
*G06F 16/182*       (2019.01)
*G06F 16/2457*      (2019.01)

(52) U.S. Cl.
CPC .......... *G06F 16/137* (2019.01); *G06F 16/182* (2019.01); *G06F 16/24573* (2019.01)

(58) Field of Classification Search
CPC . G06F 16/137; G06F 16/182; G06F 16/24573
See application file for complete search history.

(56) References Cited

PUBLICATIONS

SQLServerTutorial.net, SQL Server Create View, indexed via WebArchive on Oct. 3, 2018, retrieved on Sep. 30, 2021, retrieved from the Internet <URL: https://www.sqlservertutorial.net/sql-server-views/sql-server-create-view/> (Year: 2018).*
Stackoverflow, How to use ROWID with an Oracle Join View, Dec. 7, 2011, retrieved on Sep. 30, 2021, retrieved from the Internet <URL: https://stackoverflow.com/questions/8416734/how-to-use-rowid-with-an-oracle-join-view> (Year: 2011).*

* cited by examiner

*Primary Examiner* — Tyler J Torgrimson
(74) *Attorney, Agent, or Firm* — James J. DeCarlo; Greenberg Traurig, LLP (57) ABSTRACT

Disclosed are embodiments for replacing database table join keys with index keys. In one embodiment, a method is disclosed comprising: receiving, by a processor, annotation data, the annotation data comprising a set of rows; retrieving, by the processor, a root dataset, the root dataset stored in one or more files; generating, by the processor, a row identifier for each row in the set of rows, the row identifier storing a plurality of fields enabling alignment of a respective row in the annotation data to a corresponding row in the root dataset; generating, by the processor, an annotation dataset, the annotation dataset comprising the set of rows and corresponding row identifiers; and writing, by the processor, the annotation dataset to at least one file, the at least one file separate from the one or more files.

17 Claims, 7 Drawing Sheets

REPLACING DATABASE TABLE JOIN KEYS WITH INDEX KEYS

COPYRIGHT NOTICE

This application includes material that may be subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND

The disclosed embodiments relate to distributed data processing and, in particular, to techniques for joining data sets using index keys.

In big data and distributed processing systems such as Hadoop, it is common to amass large data sets based on, for example, high-velocity data such as clickstream data. For downstream processing of such data, it is frequently common to add additional data to the original data sets (referred to as annotating data). In current systems, adding annotations involves a duplication of the original data, forming a new dataset that includes the original data and the new annotation data. For example, annotating clickstream data comprises copying the entire clickstream data set and adding one or more columns to the data set and then populating these new columns with the annotation data. The result is that current systems are required to read and process entire data sets as well as duplicate the same data across additional files. Frequently, this copying is also performed multiple times as annotations can be added on already annotate data. Thus, if a previously annotate dataset is annotated again, the original data is copied twice, resulting in three copies of the same data.

Alternatively, some systems utilize JOIN operations to stitch together datasets from separate tables (one table storing the original data and one or more other tables storing annotations). However, in big data processing systems, data in individual datasets is not guaranteed to be in order. Thus more efficient JOIN operations are not feasible. Instead, systems must re-order each table before a JOIN operation, which raises the time complexity of such operations to O(NM) where N is the number of tables or datasets and M is the number rows in each table of a dataset.

Thus, there is a current need in the art to provide a technique for efficiently merging multiple unordered datasets.

BRIEF SUMMARY

The disclosed embodiments solve these and other technical problems by providing a storage layer for a distributed storage system that allows for the creation and access of annotation data layers. In some embodiments, the disclosed embodiments are provided as a storage layer on a Hadoop system, although the disclosed embodiments are not limited to such a system. The various techniques described herein may be implemented as a hybrid file format implemented as a thin wrapper layer on a distributed file system.

In the detailed embodiments below, a new index key is generated for each row in an annotation dataset that enables the ability to combine multiple datasets efficiently even when such datasets are in random orders across files.

In one embodiment, a method is disclosed comprising receiving, by a processor, annotation data, the annotation data comprising a set of rows; retrieving, by the processor, a root dataset, the root dataset stored in one or more files; generating, by the processor, a row identifier for each row in the set of rows, the row identifier storing a plurality of fields enabling alignment of a respective row in the annotation data to a corresponding row in the root dataset; generating, by the processor, an annotation dataset, the annotation dataset comprising the set of rows and corresponding row identifiers; and writing, by the processor, the annotation dataset to at least one file, the at least one file separate from the one or more files.

In another embodiment, a non-transitory computer-readable storage medium for tangibly storing computer program instructions capable of being executed by a computer processor is disclosed, the computer program instructions defining the steps of receiving, by a processor, annotation data, the annotation data comprising a set of rows; retrieving, by the processor, a root dataset, the root dataset stored in one or more files; generating, by the processor, a row identifier for each row in the set of rows, the row identifier storing a plurality of fields enabling alignment of a respective row in the annotation data to a corresponding row in the root dataset; generating, by the processor, an annotation dataset, the annotation dataset comprising the set of rows and corresponding row identifiers; and writing, by the processor, the annotation dataset to at least one file, the at least one file separate from the one or more files.

In another embodiment, an apparatus is disclosed comprising: a processor; and a storage medium for tangibly storing thereon program logic for execution by the processor, the stored program logic causing the processor to perform the operations of receiving annotation data, the annotation data comprising a set of rows; retrieving a root dataset, the root dataset stored in one or more files; generating a row identifier for each row in the set of rows, the row identifier storing a plurality of fields enabling alignment of a respective row in the annotation data to a corresponding row in the root dataset; generating an annotation dataset, the annotation dataset comprising the set of rows and corresponding row identifiers; and writing the annotation dataset to at least one file, the at least one file separate from the one or more files.

DETAILED DESCRIPTION

Figure 1:
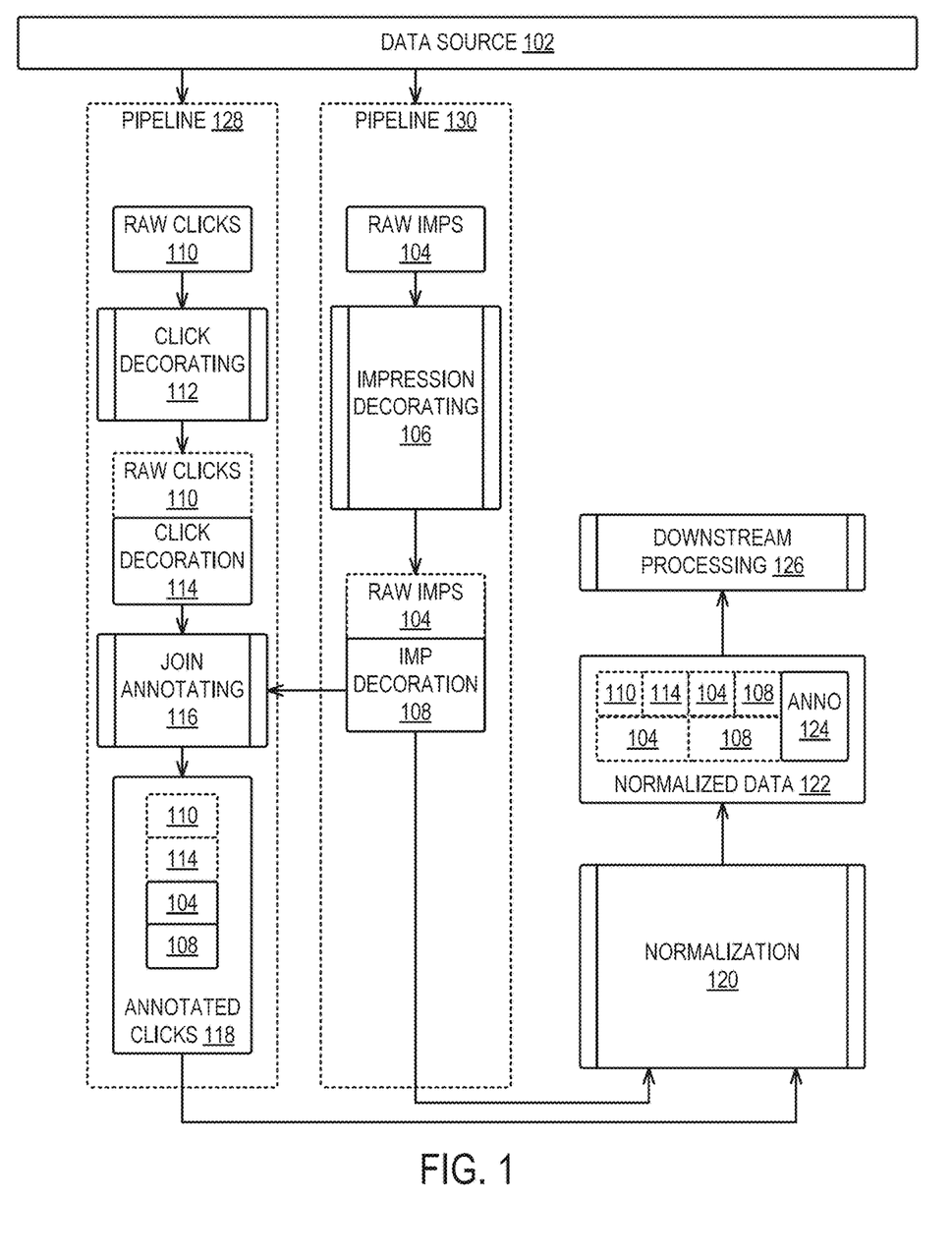
FIG. 1 is a system diagram illustrating a distributed processing system according to some embodiments of the disclosure.

FIG. 1 is a system diagram illustrating a distributed processing system according to some embodiments of the disclosure.

In the illustrated embodiment, a plurality of pipelines (128, 130) process data from a data source (102). In one embodiment, data source (102) can comprise a data lake or similar big data storage device. In the illustrated embodiment, the data source (102) can include a large volume of unstructured data. In some embodiments, the data source (102) can include structured data such as column-oriented data. In some embodiments, the data source (102) can comprise log file data storage or similar types of storage. In some embodiments, the data source (102) stores data in structured filetypes such as Orc or Parquet filetypes.

In the illustrated embodiment, the pipelines (128, 130) comprise distributed processing pipelines. Each pipeline (128, 130) may comprise a plurality of distributed computing devices. In one embodiment, each pipeline (128, 130) can read data from the data source (102), process the data, and load the data into a structured data repository. In some embodiments, all of the above processing may be done in a distributed computing environment running on commodity hardware (e.g., a Hadoop cluster or similar cluster).

The illustrated pipelines (128, 130) further illustrate an annotation workflow. As used herein, annotation refers to the processing of stored data to add new data or supplement the data with existing data. Data to be annotated is referred to as raw data or a raw data set. Additions to the raw data are referred to as annotated data. A combination of raw data and annotated data is referred to as composite data.

In the pipeline (130), raw impression data (104) is received. The use of impression data is provided as an example, and other data types may be used. The embodiments place no limit on the underlying type of data processed herein. The raw impression data (104) can refer to data regarding the display of content in webpages (e.g., the time viewed, the owner of the content, etc.). Raw impression data (104) is generally amassed via log files that log the selection and display of content. In the illustrated embodiment, the raw impression data (104) can comprise a plurality of database columns and rows. In some embodiments, this data can be stored in Orc, Parquet, or other column-oriented data formats.

The raw impression data (104) is processed during an impression decorating stage (106). In the illustrated embodiment, the impression decorating stage (106) can comprise a Pig or Hive script or other similar data processing script. Generally, the impression decorating stage (106) performs one or more operations on the raw impression data (104). For example, the impression decorating stage (106) can add additional columns to the raw impression data or can alias column names.

The output of the impression decorating stage (106) is an impression annotation data set, also referred to as a decorated impression data set (108). As illustrated, the impression decorating stage (106) does not copy the raw impression data (104) to a new location. Instead, the raw impression data (104) is locally processed. That is, the impression decorating stage (106) can comprise a distributed algorithm that is run on the same device that is storing the raw impression data (104). In contrast, however, the decorated impression data (108) is written to disk after being created. In the illustrated embodiment, the decorated impression data set (108) comprises a set of columns capturing only the new data to decorate the raw impression data. The decorated impressions (108) and raw impressions (104) are accessed by pipeline (128) to annotate a clickstream further, as described herein.

Similar to the pipeline (130), pipeline (128) receives raw click data (110). In one embodiment, raw click data (110) can comprise data regarding user selection of digital content. For example, while raw impression data (104) can include rows for each time a piece of content is displayed on a web page, raw click data (110) can include rows for each time that content is selected by a user.

Similar to the impression decorating stage (106), the click decorating stage (112) adds one or more columns or fields to the raw data. As in stage (106), the click decorating stage (112) generates these additional columns for fields as a physically distinct file (114). Thus, the click decorating stage (112) does not modify or copy the raw click data (110) when generating the decorate click data (114).

In the illustrated embodiment, a join annotating stage (116) receives the raw click and impression data (110, 104) and the decorated clicks and impressions (114, 108). In some embodiments, the join annotating stage (116) copies the impression data (104, 108) to form the annotated clicks data set (118). In one embodiment, the join annotating stage (116) filters the impression data (104, 108) to identify only that impression data relevant to the click data (110, 114) and uses the filtered data as an annotation set to generate the annotated clicks.

In the illustrated embodiment, a normalization stage (120) is configured to receive the combined impression composite data set (104, 108) and the composite annotated clicks data set (118). In one embodiment, the normalization stage (120) is configured to add a further annotation to the composite data sets. For example, the normalization stage may perform grouping or sorting of the data as well as synthesized columns based on aggregations of the underlying data. As a result, the normalization stage (20) generates a normalized annotation data set (122). As illustrated, only the annotations (124) are written to disk during this stage, and the remaining data (104, 108, 110, 114) is not copied to a new location on disk.

Finally, the normalized annotation data set (112) is provided to downstream processing applications for analysis, further processing, and storage, as required by such applications. As indicated in the figure via dotted lines, data sets in the pipelines are not copied during the annotation phases. The result is that the normalized data (122) can include the annotation results of the pipeline (128, 130) stages, the normalization annotations, and the raw underlying data without incurring the computationally expensive copying costs required by existing solutions. Specific methods for avoiding this unnecessary copying are described in more detail herein in the context of a distributed computing platform such as Hadoop.

Figure 2A:
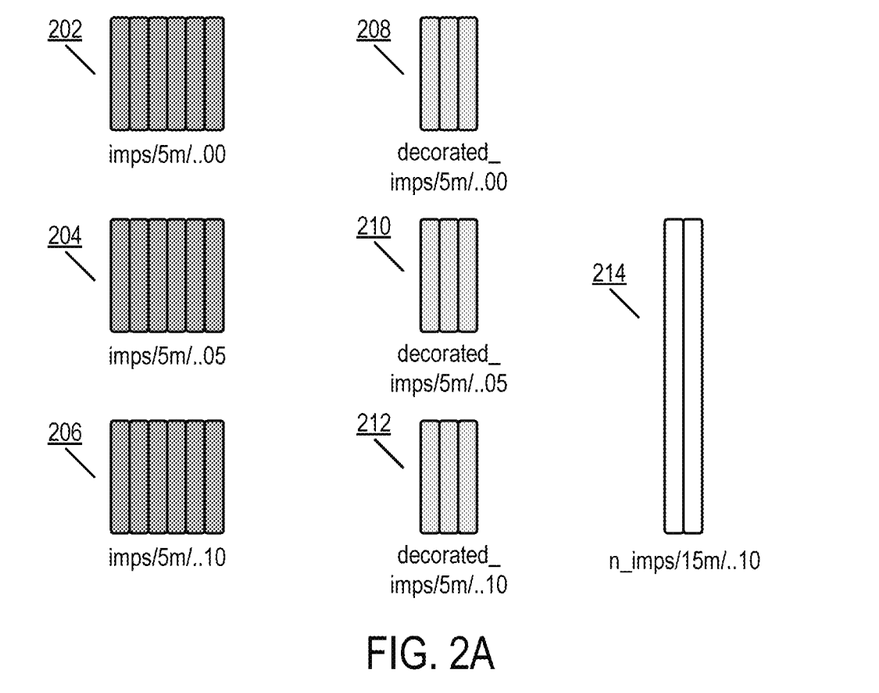
FIG. 2A illustrates the physical storage layout of a distributed processing system according to some embodiments of the disclosure.

FIG. 2A illustrates the physical storage layout of a distributed processing system according to some embodiments of the disclosure.

In the illustrated embodiment, a set of rows and columns representing raw data is stored at three locations (202, 204, 206). As one example, these locations (202, 204, 206) can comprise three physically distinct storage devices storing a portion of the entire data set represented by the portions. In one embodiment, each location (202, 204, 206) comprises a file, and each file can be stored on the same or different computing devices.

In addition to raw data (202, 204, 206), decoration data is stored in three locations (208, 210, 212). Similar to locations (202, 204, 206), the decoration data is stored in individual files stored on the same or different computing devices. Notably, the decoration data is stored in files separate from the raw data.

Finally, the second level of annotation data is stored at location (214). Again, this location comprises a separate file from the previous locations (202 through 212). Thus, each set of annotations is stored in physically separate files or other structures. Further, there is no limitation on the mapping of the number of files between raw data and annotations. As illustrated, raw data is stored in three files at three locations (202, 204, 206).

Similarly, second level annotation data is also stored in three files at three locations (208, 210, 212). However, the final layer of annotation data is stored in a single file at one location (214). To facilitate this, each annotation structure includes a row identifier that will be described in more detail herein that enables the stitching together of raw data and annotations during processing.

Figure 2B:
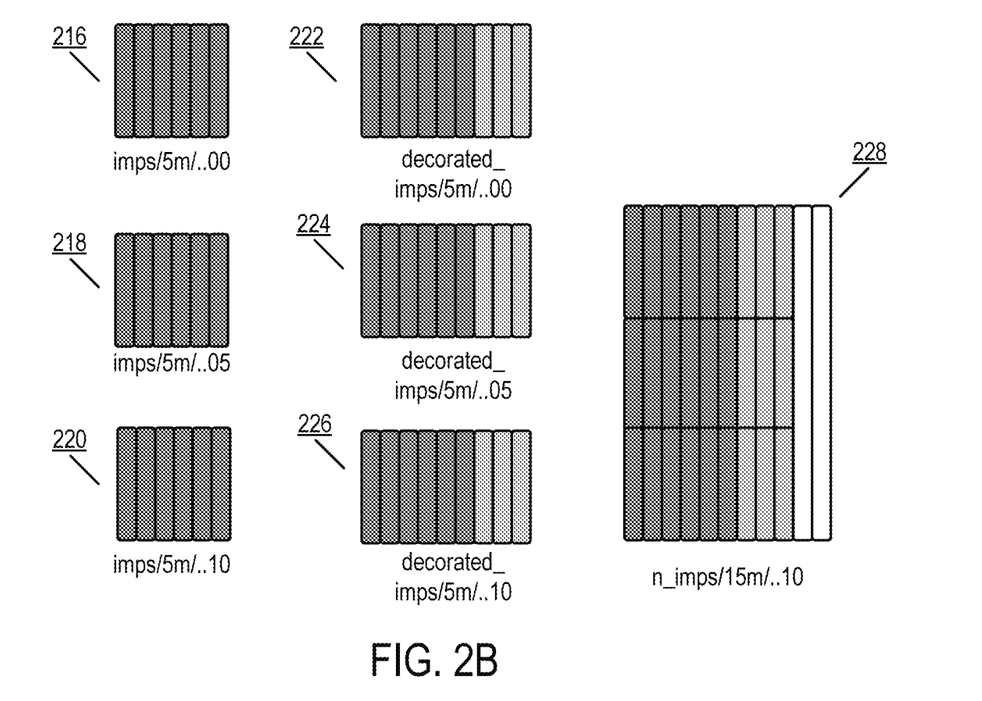
FIG. 2B illustrates the logical storage layout of a distributed processing system according to some embodiments of the disclosure.

FIG. 2B illustrates the logical storage layout of a distributed processing system according to some embodiments of the disclosure.

The illustrate storage layout comprises a logical view of the same data depicted physically in FIG. 2A. The illustrated view represents the view of data presented to downstream applications accessing the annotation data sets. In the illustrated embodiment, raw data sets are stored at first locations (216, 218, 220), first annotations are stored at second locations (222, 224, 226), and a third annotation is stored at a third location (228). When accessing the first annotations (222, 224, 226), a downstream processing algorithm accesses both the annotations (e.g., 208) and the raw data (e.g., 202) when accessing the second location (222). Further, when accessing the third location (228), the entire annotation data set appears as a single logical data set while comprising separate physical files.

Figure 3:
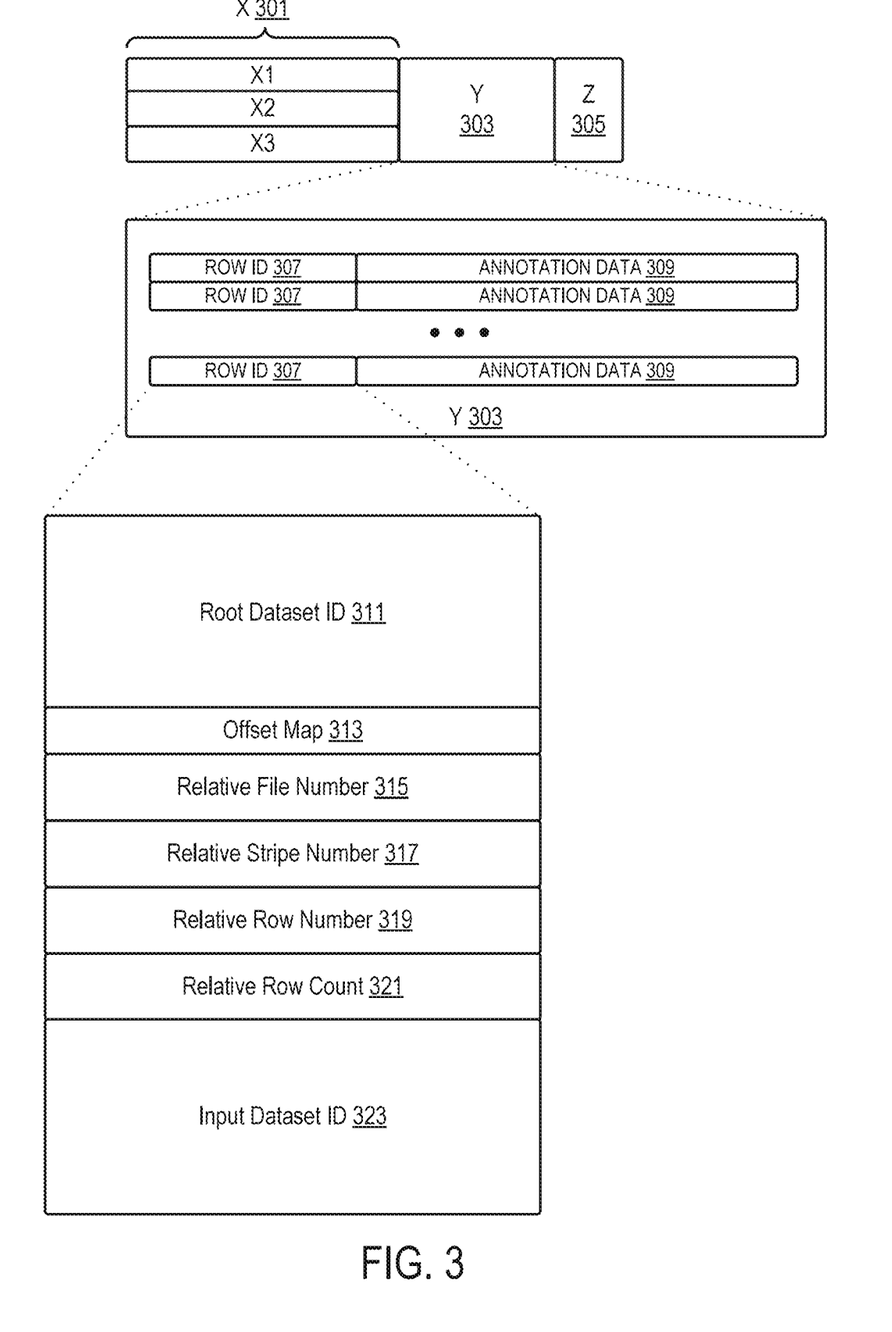
FIG. 3 is a diagram of a dataset according to some embodiments of the disclosure.

FIG. 3 is a diagram of a dataset according to some embodiments of the disclosure.

In the illustrated embodiment, a root dataset X (301) is illustrated. As used herein, a root dataset refers to a source of data to be annotated. For example, clickstream data captured during the operation of a web server may comprise a root dataset. In general, a root dataset does not include annotation data.

In some embodiments, the root dataset may comprise a set of root datasets. For example, a root dataset may comprise a clickstream dataset spanning fifteen minutes. This root dataset may be generated based on three five-minute root datasets. Thus, returning to FIG. 3, dataset X may comprise a combination of root datasets X1, X2, and X3. These root datasets (X1, X2, X3) all share the same (or similar) schema but may vary based on a given key (e.g., timestamp). As will be discussed, in this scenario, the root datasets (X1, X2, X3) may be stored in separate files, and thus any future annotations must be aligned to these individual files. However, for the sake of brevity, the root dataset (301) will be described as a single dataset.

As illustrated, annotation datasets Y and Z (303, 305) are depicted as extensions of the root dataset. As described above, these datasets Y and Z (303, 305) may be stored separately from the root dataset X (301) and may include additional columns to annotate the root dataset X (301). In the illustrated embodiment, dataset Y (303) is exploded to show the detail of such an annotation dataset.

Dataset Y (303) comprises a set of fields. Each field includes annotation data (309) and an annotated row identifier (ID) (307) (also referred to as a "row ID"). The fields may be ordered or unordered. In the illustrated embodiment, the annotation data (309) can comprise any data to annotate the rows of the root dataset X (301), and no limitation is placed on the type of annotation data (309).

The row ID (307) comprises a data structure that allows for the reconstruction of the datasets (301, 303, 305) at a later date. As described above, the system may not guarantee that the data stored in datasets (301, 303, 305) is returned in order. Further, since datasets (301, 303, 305) are stored separately and may be segmented differently, there is no mechanism to align the datasets (301, 303, 305) using auto-incrementing keys or similar techniques employed by, for example, relational databases.

The annotated row ID (307) includes a plurality of fields. Each row of the annotated dataset (e.g., 303) includes a row ID generated during the creation of the row.

In the illustrated embodiment, the row ID (307) includes a root dataset ID field (311). In the illustrated embodiment, this field (311) identifies the root dataset that the annotation data is aligned to. In the illustrated embodiment, this dataset comprises root dataset X. In some embodiments, as discussed, the field (311) may refer to a subset of the root dataset (e.g., X1, X2, or X3). In some embodiments, the field (311) comprises a 64-bit value. In some embodiments, the field (311) is generated by hashing the filename of the root dataset to generate a first hash and hashing the timestamp of when the root dataset was created to generate a second hash. These two hashes are then concatenated to form the root dataset ID. In some embodiments, the first hash comprises a hash of the UNIX epoch time. In alternative embodiments, the first hash comprises a bit-shifted, 32-bit field generated based on the UNIX epoch time (e.g., unixtime<<32). In some embodiments, the second hash comprises a 32-bit hash of the filepath of the root dataset. In this manner, the root dataset ID values are sortable based on the creation timestamp followed by the file path. In some embodiments, a global lookup table may be employed that maps root dataset IDs to integer values, thus shortening the field (311), which can then only include a single-digit lookup key.

In the illustrated embodiment, the row ID (307) includes an offset map field (313). In some embodiments, the offset map field (313) comprises a 1-byte value. In the illustrated embodiment, the offset map field (313) comprises a set of bit patterns that describe the length of the following three fields (315, 317, 319). In one embodiment, the offset map field (313) can include multiple bit patterns. For example, bits 0 and 1 of the offset map field (313) may indicate the length of a first field (315), bits 2 and 3 may indicate the length of the second field (317), and bits 4 and 5 may indicate the length of the third field (319). In this example, bits 6 and 7 may be reserved. In one embodiment, the values in the 2-bit patterns may be mapped to specific lengths. For example, the value 0b00 may indicate a 1-byte length, the value 0b01 may indicate a 2-byte (short) length, the value 0b10 may indicate a 4-byte (int) length, and the value 0b11 may indicate an 8-byte (long) length. As one example, the following bit pattern indicates that field (315) is two bytes, field (317) is eight bytes, and field (319) is one byte: 01110000. In some embodiments, the offset map field (313)

may only comprise enough bits to represent the lengths of the three fields (315, 317, 319). Thus, the offset map field (313) may only comprise a six-bit field. In an alternative embodiment, the offset map field (313) may further include a 2-bit split strategy field. This split strategy field may comprise a field indicating the method used to split the root dataset for annotation. Values may include splitting a dataset based on file boundaries or stripe boundaries. In one embodiment, the split strategy field may be placed at the end of the offset map field (313). In other embodiments, the split strategy field may be placed at the beginning of the offset map field (313), as illustrated in the example provided herein. The specific placement of the split strategy field should not be construed as limiting the disclosed embodiments and other positions may be utilized.

The following four fields (315, 317, 319, 321) comprise variable length fields indicating encoded relative file numbers, stripe numbers, and row numbers, respectively. These fields are used to align a given row to a root dataset, as described in more detail herein.

In the illustrated embodiment, the relative file number field (315) comprises a field indicating the file from which the record originates. This field (315) is used by a partitioner to hash records from a single file into a single output file. The relative file number is an integer value enumerating the input files within a single dataset; thus, it is relative to the dataset component of the row ID. The relative file number field (315) is generated from an ordered traversal of the location path where the root dataset is located. In the illustrated example, this would be a file number relative to the originating dataset X (301) from which the file or stripe alignment is computed.

The relative stripe number (317) comprises the number of the stripe in which a record will be read. This field (317) is used by a partitioner to hash records from a single stripe into a single output file and stripe chunks. In some embodiments, the field (317) represents the stripe number relative to the file the stripe is located in. In the illustrated embodiment, this would be the stripe number in the file from root dataset X (301). In some embodiments, the stripe number is set to zero if file-based partitioning is used. Otherwise, the relative stripe number represents the nth stripe in the relative file number from which the row originates.

The relative row number field (319) is relative to a file or stripe, depending on the strategy used. Additionally, the row ID (307) includes a relative row count (321). In one embodiment, the relative row count (321) represents the total number of rows in a given file or stripe. In the illustrated embodiment, the relative row count (321) is the same width as the relative row number (319). The relative row number (319) may be listed last since it is not needed for sorting.

In the illustrated embodiment, each field in the row ID (307) is encoded in Big Endian order. In some embodiments, all integral values should be zero-padded or space-padded.

Finally, the row ID (307) includes an input dataset ID (323). In the illustrated embodiment, the input dataset ID (323) is generated in the same manner the root dataset ID (311) is generated (i.e., by concatenating hashes of the filename and creation timestamp). However, the input dataset ID (323) refers to the dataset containing the associated data. Thus, in the illustrated example, input dataset ID (323) would refer to dataset Y (303).

The following example illustrates the above format. In this example, a dataset has ten files, ten splits per file, and 1000 rows per split. In the illustrated embodiment, a stripe strategy is used (aligning based on stripes and not files). In this example, the first eight bytes are fixed and represent the root dataset ID. The next (ninth) byte may be encoded as 0b01000001 and corresponds to the offset map (313). The first two bits ("01") indicate the stripe split strategy. The next two bits ("00") indicates that files can be represented using one byte. The next two bits ("00") indicate that stripes may be stored as a byte. The last two bits ("01") indicate that a row number and row count can be encoded as a short since the number of rows (1000) is less than greater than one byte. Thus, the next four fields (315, 317, 319, 321) will require one byte, one byte, two bytes, and two bytes, respectively. Alternatively, if the split strategy bits are aligned at the end of the offset map field (313), the value of the field (313) would be 0b00000101 (the foregoing description of each set of bits applies equally to this embodiment). Finally, the input dataset ID (323) is fixed at eight bytes. Thus, the total length of the row ID is 23 bytes. Thus, the format described above saves nine bytes of storage space for each row as compared to standard 32-bit identifier values.

The above format also enables the sorting of rows based not on an auto-incrementing counter but based on the partitioning strategy. Because the first eight bytes are fixed and represent a dataset, this implies that all row IDs for a given dataset will be grouped together by the sorting algorithm due to this being prefixed. All of the rows for a given dataset will logically share the same value of the encoding byte because this is a constant based upon dataset level metadata. All values sharing the same encoding byte value will be the same length and right padded within that length, making all rows within a given dataset comparable by row ID in their natural order. Thus, the row ID is sortable.

Figure 4A:
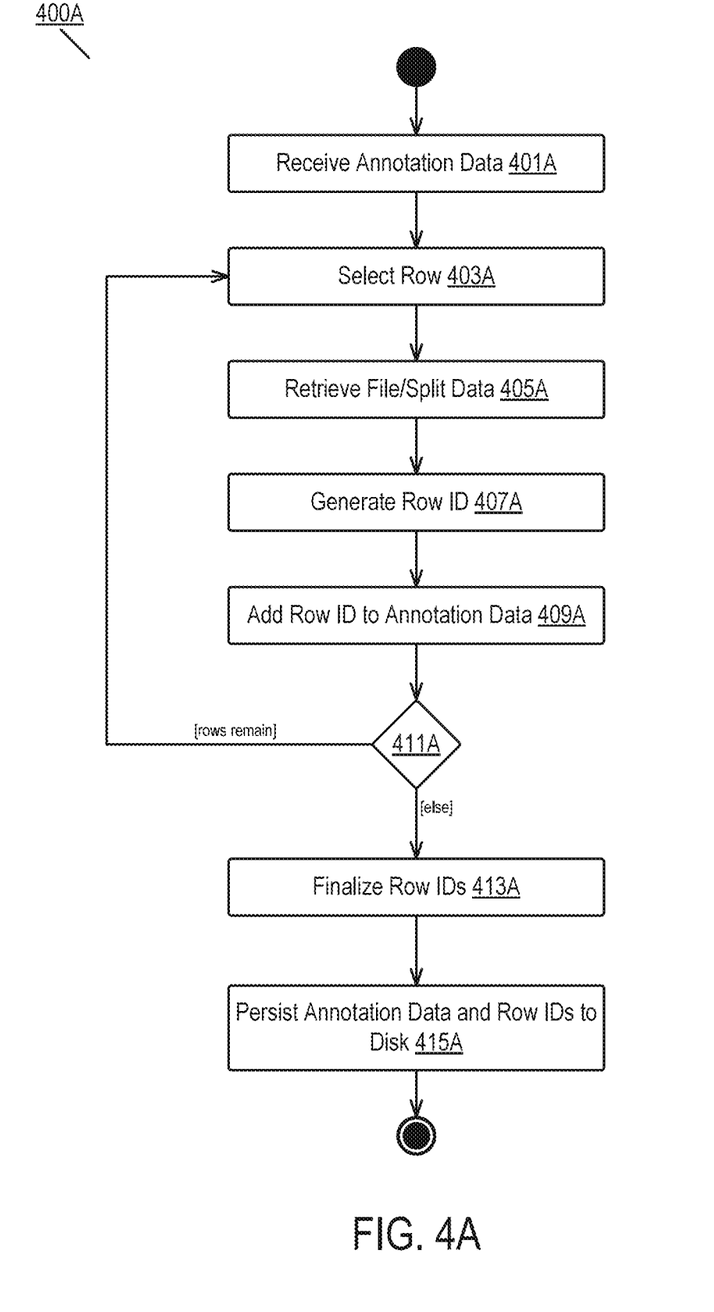
FIG. 4A is a flow diagram illustrating a method for generating a row identifier according to some embodiments of the disclosure.

FIG. 4A is a flow diagram illustrating a method for generating a row identifier according to some embodiments of the disclosure.

In step 401a, the method (400a) receives annotation data. The annotation data may comprise any data desired to be added to an existing (root) dataset. As one example, a root dataset may comprise a set of advertisement impression records. In this example, the annotation data could comprise a column indicating the total bid values for each advertiser associated with a given advertisement impression record. In this example, the annotation data is generated programmatically (e.g., by grouping and summing the root dataset records). In other embodiments, the annotation may comprise flags or other data that is added without analyzing the entire dataset. In general, the annotation data comprises useable data, generally in a columnar format, to "extend" the root dataset with, as depicted previously.

In some embodiments, the method (400a) receives this data in the form of a Pig script or similar programming language. That is, the method (400a) may be executed as part of a distributed processing task which devices the transformation step in an extract-transform-load (ETL) procedure.

In steps 403a through 411a, the method (400a) iterates through a set of rows. As described above, the annotation data may be structured in a row-oriented fashion. Thus, in step 403, the method (400a) selects a given row. In most embodiments, the method (400a) iterates through rows in order; however this is not a requirement.

In step 405a, the method (400a) retrieves file and split data.

In the illustrated embodiment, the method (400a) executes after loading a root dataset. That is, prior to step 401a, the method (400a) loads a root dataset to annotate. Thus, prior to step 405a, the method (400a) obtains at least one file or part of a file that includes the root dataset (or part thereof). This file may also include a set of stripes (segments of the file) that includes rows of the root data.

In this embodiment, the method (400a) obtains a set of rows (e.g., 1000 rows) and iterates through each row (steps 403a through 411a) to add additional annotation data in the form of additional columns. In step 405a, the method (400a) analyzes the retrieved root dataset as well as the current row of the root dataset to identify the file or split data. In some embodiments, this entails analyzing a metadata file associated with the root dataset which stores this information. Details of file and split data are provided in the description of FIG. 3 and are not repeated herein.

In step 407a, the method (400a) generates a row ID. The format of the row ID is described in FIG. 3, and that description is incorporated herein. In the illustrated embodiment, the creation of a row ID may be transparent to the annotation script that initiates the method (400a). That is, the annotation script may add annotation data to a root dataset, and the row ID generation process can be performed in the background, without requiring explicit commands from the annotation script. In another embodiment, the method (400a) may require an affirmative command in the annotation script to generate the row ID. For example, a Pig user-defined function (UDF) may be inserted during the data generation steps to insert the row ID.

In step 409a, the method (400a) adds the row ID to the annotation data. As described above, in some embodiments, the method (400a) adds the row ID as an additional column of the annotation data. Notably, in some embodiments, the row ID is not returned to the user as part of the annotation data during later operations but is rather used internally to re-order annotation data rows based on the corresponding root dataset. In some embodiments, the method (400a) may split the row ID into separate columns. For example, each of the fields in the row ID may be stored in a separate column. In this embodiment, the underlying column storage format can optimize storage of the row ID components since certain fields (e.g., root dataset ID, file number) will be identical for all rows in a split.

In step 411a, the method (400a) determines if all rows of the annotation have been processed. If not, the method (400a) re-executes the preceding steps (403a, 405a, 407a, 409a, 411a) for the remaining rows.

In step 413a, after generating a row ID for each row of annotation data, the method (400a) finalizes the row IDs. In some embodiments, step 413 is optional. In some embodiments, the previously described steps may be executed for a portion of a root dataset. Further, the foregoing steps may be executed on multiple processors in parallel. In these embodiments, the method (400a) outputs a partial metadata file describing the row IDs generated. A second, aggregator process analyzes a plurality of these partial metadata files to finalize the row ID in relation to the entire root dataset.

In step 415a, the method (400) persists the annotation data and row identifiers to disk. In some embodiments, the persisting to disk comprises writing one or more files to disk. In some embodiments, these files map one-to-one with the files containing the root dataset. However, in other embodiments, the number of files containing annotation data may differ from the number of files containing the root dataset. In this manner, the annotation data may be optimized to be included in a smaller number of files than the root dataset. Further, since the row IDs enable alignment of datasets, no limitations are placed on the number of files used to store annotation data.

Figure 4B:
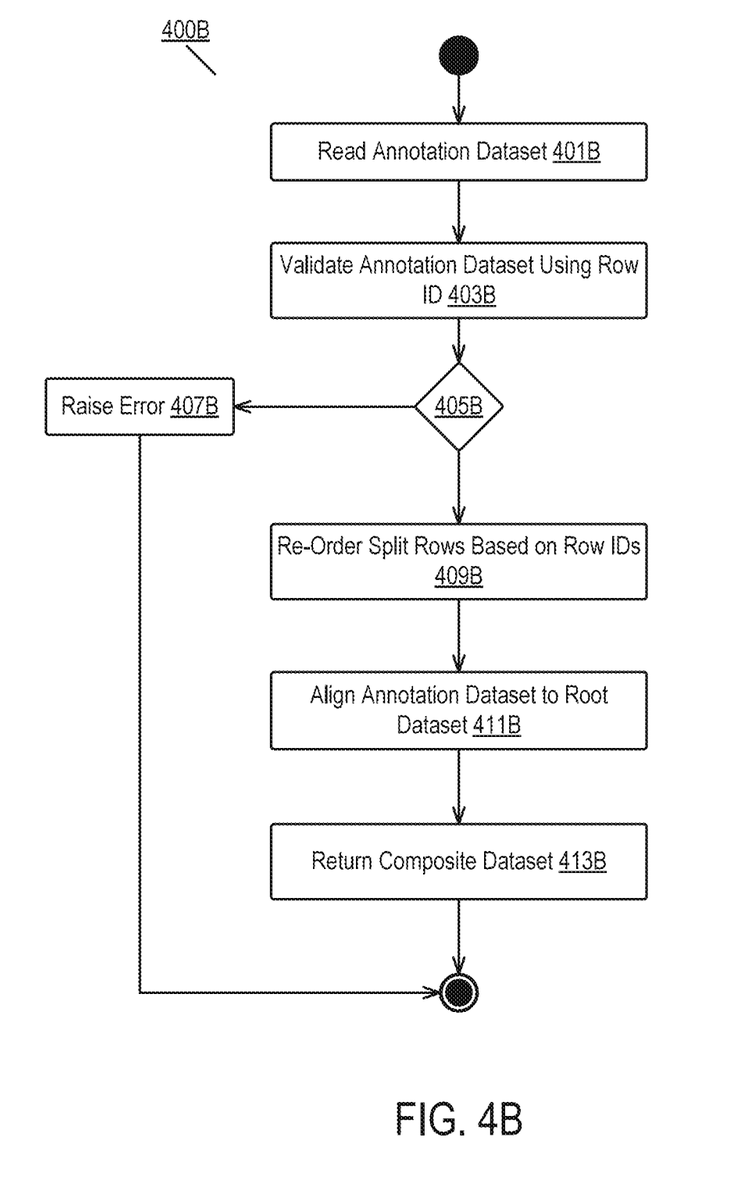
FIG. 4B is a flow diagram illustrating a method for generating an annotated dataset using a row identifier according to some embodiments of the disclosure.

FIG. 4B is a flow diagram illustrating a method for generating an annotated dataset using a row identifier according to some embodiments of the disclosure.

In step 401b, the method (400b) reads an annotation dataset. In one embodiment, the annotation dataset may include a plurality of files and a plurality of splits, as discussed in more detail in FIGS. 6A and 6B.

In step 403b, the method (400b) validates the annotation dataset using the row ID. In one embodiment, the method (400b) operates on individual splits. In some embodiments, the method (400b) may be implemented by multiple processors, each processor operating on a single split. In one embodiment, the method (400b) analyzes the relative row number in each row identifier to validate whether the split contains the proper rows; further, the method (400b) can utilize the relative row count to validate that the rows in a given split are returned in order. If the method (400b) determines that the proper rows exist in the split, but are out of order, the method (400b) can reorder the rows using the relative row number, as described below.

In step 405b, the method (400b) determines whether any validations have failed. In some embodiments, step 405b additionally includes attempting to correct any failed validations (as described above). If the method (400b) detects uncorrectable validation failures, the method (400b) raises an error (407b), and the process ends.

In step 409b, the method (400b) re-orders the rows of each split of the annotation dataset based on the row identifiers. As described in FIG. 3, the row identifier comprises a sortable byte array. Thus, for each split containing the annotation data, the method (400b) can re-order the split data by sorting the rows of the annotation dataset based on the row ID. Thus, after step 409b, the method (400b) ensures that each split (either file- or stripe-based) is properly ordered based on the original annotation ordering.

In step 411b, the method (400b) aligns the annotation dataset to the root dataset. In the illustrated embodiment, after step 409b, the method (400b) properly orders the individual splits of the annotation data. In some embodiments, the method (400a) uses a subset of the row ID as an alignment ID. Specifically, the method (400a) may concatenate the root dataset ID (311), relative file number (315), relative split number (317), and relatively row count (321) and use this concatenated value as an alignment ID. In some embodiments, the method (400a) uses a metadata file associated with a given split to map the annotation split to a corresponding root dataset split. These matching splits are then combined to form a composite dataset after aligning the root dataset rows with the annotation dataset rows.

In step 413b, the method (400b) returns the composite dataset. In the illustrated embodiment, the composite dataset comprises rows, including columns from each of the root and annotation datasets. In operation, map tasks are assigned to process each split (including all files associated with a split). The map tasks access the data files and stitch together the rows based on the row identifiers aligning the data. The map tasks then return the composite dataset to a set of reducers, which concatenates the output to a complete composite dataset.

Figure 6A:
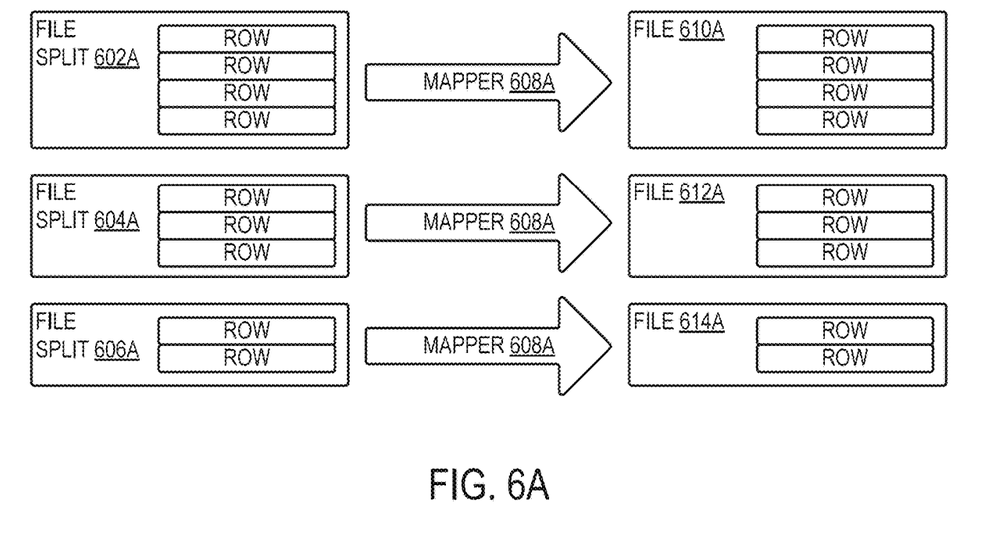
FIG. 6A is a diagram illustrating a mapping process performed in a distributed computing environment using a file-based alignment scheme according to some embodiments of the disclosure.

FIG. 6A is a diagram illustrating a mapping process performed in a distributed computing environment using a file-based alignment scheme according to some embodiments of the disclosure.

In one embodiment, the illustrated dataset comprises a root dataset, although composite datasets may also be read. Multiple physical files may be read when reading a dataset. As illustrated in FIG. 6A, a dataset is split based on file boundaries into three files (602*a*, 604*a*, 606*a*), each file containing a set of rows. In one embodiment, the system forces the distributed file system to split data based on file boundaries.

The system can generate an annotation dataset using a single mapper. As known in the art, mapper tasks are distributed to data nodes of a Hadoop system. The system causes the system to distribute the map task (608*a*) to each data node containing the files (602*a*, 604*a*, 606*a*). The map task (608*a*) is configured to operate on a single file. As described previously, the map task (608*a*) annotates the rows of a given file (602*a*, 604*a*, 606*a*) and generates annotation row identifiers for the resulting annotation dataset. In the illustrated embodiment, the writing is mapper only: no reduce phase is required to generate the output files (610*a*, 612*a*, 614*a*). In some embodiments, a reducer phase can be implemented if needed by the underlying ETL instructions. If a reducer phase (not illustrated) is included, a separate final partition reducer stage is needed.

The system generates annotation dataset metadata. In one embodiment, this may be performed by a reducer task. In one embodiment, the metadata describes the annotation dataset. The metadata may include structural metadata, split coordination metadata, and a schema. In some embodiments, the metadata for a given annotation set is stored in a file separate from the underlying data.

In general, the output annotation dataset is composed of horizontal and vertical unions of raw datasets. In some embodiments, each annotation dataset is assigned a unique identifier (e.g., a 64-bit identifier). Structural metadata provides the ID of the annotation dataset that the metadata describes as well as the ID's of the datasets from which the annotation dataset is constructed and how those sets are combined with one another. The split coordination metadata describes how the annotation data file is split. In the illustrated embodiment, the split coordination metadata includes a fixed-length array that enumerates all splits in the dataset. In the illustrated embodiment, elements of the array include a relative path name followed by a start and length that covers the entire file. In one embodiment, the schema metadata may comprise a list of columns added via the annotation dataset.

Further detail on metadata files for annotation datasets is provided in U.S. patent application Ser. No. 16/727,142.

The system writes the annotation dataset to disk. As illustrated, the output of the map task (608*a*) comprises files (610*a*, 612*a*, 614*a*), including rows representing the annotation data. Thus, as a final stage, the mappers (608*a*) write the annotation datasets to the files identified in the metadata file. Alternatively, if reducer stages are implemented, the reducer may write the files.

Figure 6B:
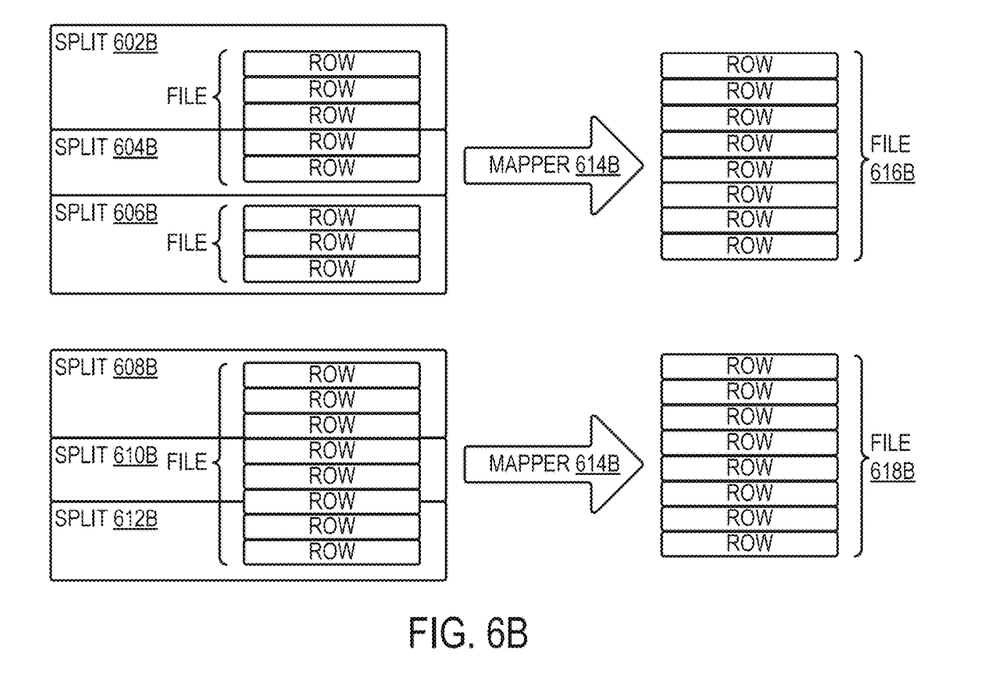
FIG. 6B is a diagram illustrating a mapping process performed in a distributed computing environment using a stripe-based alignment scheme according to some embodiments of the disclosure.

FIG. 6B is a diagram illustrating a mapping process performed in a distributed computing environment using a stripe-based alignment scheme according to some embodiments of the disclosure.

The system reads a dataset. In one embodiment, the dataset comprises a root dataset, although composite datasets may also be read. Multiple physical files may be read when reading a dataset. As illustrated in FIG. 6B, a dataset is split based on stripe boundaries into six splits (602*b*, 604*b*, 606*b*, 608*b*, 610*b*, 612*b*), each split containing a set of rows. Although described using stripes, RowGroups or other similar constructs may be used. As illustrated, a given file may span splits (e.g., 602*b*, 604*b*).

The system selects a set of stripes from a given dataset. In some embodiments, the system may select a preconfigured number of stripes based on system requirements (e.g., a preferred stripe length for output data). As illustrated in FIG. 6B, the resulting stripes may span multiple files. Thus, a stripe-based alignment mechanism enables a reduced number of data files for an annotation dataset since decisions are premised on stripes rather than files.

The system generates an annotation dataset using a single mapper. As known in the art, mapper tasks are distributed to data nodes of a Hadoop system. The system causes the system to distribute the map task (614*b*) to each data node containing the stripes (602*b*, 604*b*, 606*b*, 608*b*, 610*b*, 612*b*). The map task (614*b*) is configured to operate on a set of stripes in one or more splits. As described previously, the map task (614*b*) annotates the rows of a given split (602*b*, 604*b*, 606*b*, 608*b*, 610*b*, 612*b*) as well as generates annotation row identifiers for the resulting annotation dataset. In the illustrated embodiment, the writing is mapper only, but reducer phases may be added as described previously in connection with FIG. 6A.

The system generates annotation dataset metadata. In one embodiment, this may be performed by a reducer task. In one embodiment, the metadata describes the annotation dataset. The metadata may include structural metadata, split coordination metadata, and a schema, as described in the description of FIG. 6A. In contrast to the metadata generated in FIG. 6A, the split coordination metadata would include more entries containing file paths but would include smaller lengths and non-zero starting locations indicating stripe boundaries.

The system writes the annotation dataset to disk. As illustrated, the output of the map task (614*b*) comprises files (616*b*, 618*b*), including rows representing the annotation data. Thus, as a final stage, the mappers (614*b*) write the annotation datasets to the files identified in the metadata file. Alternatively, if reducer stages are implemented, the reducer may write the files.

Figure 5:
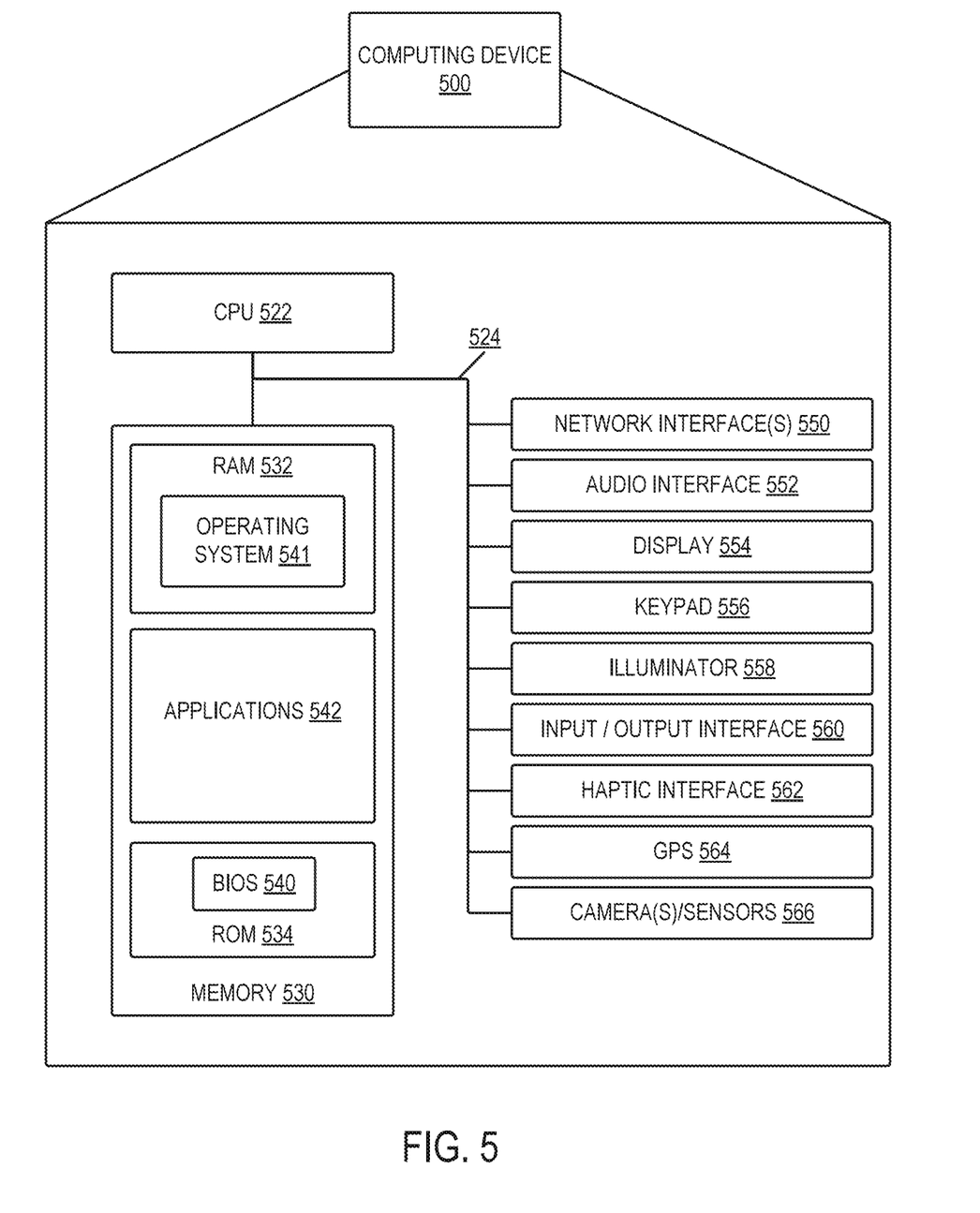
FIG. 5 is a schematic diagram illustrating a computing device showing an example embodiment of a client or server device that may be used within the present disclosure.

FIG. 5 is a schematic diagram illustrating a computing device showing an example embodiment of a client or server device that may be used within the present disclosure.

The computing device (500) may include more or fewer components than those shown in FIG. 5. For example, a server computing device may not include audio interfaces, displays, keypads, illuminators, haptic interfaces, GPS receivers, cameras, or sensors.

As shown in the figure, the device (500) includes a processing unit (CPU) (522) in communication with a mass memory (530) via a bus (524). Computing device (500) also includes one or more network interfaces (550), an audio interface (552), a display (554), a keypad (556), an illuminator (558), an input/output interface (560), a haptic interface (562), an optional global positioning systems (GPS) receiver (564) and a camera(s) or other optical, thermal, or electromagnetic sensors (566). Device (500) can include one camera/sensor (566), or a plurality of cameras/sensors (566), as understood by those of skill in the art. The positioning of the camera(s)/sensor(s) (566) on the device (500) can change per device (500) model, per device (500) capabilities, and the like, or some combination thereof.

The computing device (500) may optionally communicate with a base station (not shown), or directly with another computing device. Network interface (550) is sometimes known as a transceiver, transceiving device, or network interface card (NIC).

The audio interface (552) is arranged to produce and receive audio signals such as the sound of a human voice. For example, the audio interface (552) may be coupled to a speaker and microphone (not shown) to enable telecommunication with others and/or generate an audio acknowledgment for some action. Display (554) may be a liquid crystal display (LCD), gas plasma, light emitting diode (LED), or any other type of display used with a computing device. Display (554) may also include a touch-sensitive screen arranged to receive input from an object such as a stylus or a digit from a human hand.

Keypad (556) may comprise any input device arranged to receive input from a user. Illuminator (558) may provide a status indication and/or provide light.

The computing device (500) also comprises input/output interface (560) for communicating with external. Input/output interface (560) can utilize one or more communication technologies, such as USB, infrared, Bluetooth™, or the like. The haptic interface (562) is arranged to provide tactile feedback to a user of the client device.

Optional GPS transceiver (564) can determine the physical coordinates of the computing device (500) on the surface of the Earth, which typically outputs a location as latitude and longitude values. GPS transceiver (564) can also employ other geo-positioning mechanisms, including, but not limited to, triangulation, assisted GPS (AGPS), E-OTD, CI, SAI, ETA, BSS, or the like, to further determine the physical location of the computing device (500) on the surface of the Earth. In one embodiment, however, the computing device (500) may through other components, provide other information that may be employed to determine a physical location of the device, including, for example, a MAC address, Internet Protocol (IP) address, or the like.

Mass memory (530) includes a RAM (532), a ROM (534), and other storage means. Mass memory (530) illustrates another example of computer storage media for storage of information such as computer-readable instructions, data structures, program modules or other data. Mass memory (530) stores a basic input/output system ("BIOS") (540) for controlling the low-level operation of the computing device (500). The mass memory also stores an operating system (541) for controlling the operation of the computing device (500).

Applications (542) may include computer-executable instructions which, when executed by the computing device (500), perform any of the methods (or portions of the methods) described previously in the description of the preceding Figures. In some embodiments, the software and/or programs implementing the method embodiments can be read from hard disk drive (not illustrated) and temporarily stored in RAM (532) by CPU (522). CPU (522) may then read the software and/or data from RAM (532), process them, and store them to RAM (532) again.

For the purposes of this disclosure, a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer-readable medium for execution by a processor. Modules may be integral to one or more servers or be loaded and executed by one or more servers. One or more modules may be grouped into an engine or an application.

For the purposes of this disclosure, the term "user," "subscriber," "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than or more than, all the features described herein are possible.

Functionality may also be, in whole or in part, distributed among multiple components, in manners now known or to become known. Thus, myriad software/hardware/firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   reading, by a processor, annotation data, the annotation data comprising a set of rows stored in a first file;
   reading, by the processor, a root dataset, the root dataset stored in one or more files separate from the first file;
   generating, by the processor, a row identifier for each row in the set of rows, the row identifier storing a plurality of fields representing an alignment of a respective row in the annotation data to a corresponding row in the root dataset, the row identifier comprising a concatenation of a root dataset identifier, a relative file number relative to the root dataset, and a relative row number;
   generating, by the processor, an annotation dataset, the annotation dataset comprising the set of rows and corresponding row identifiers; and
   writing, by the processor, the annotation dataset to at least one file, the at least one file separate from the one or more files and the first file.

2. The method of claim 1, further comprising:
   generating, by the processor, a first hash of a creation timestamp of a file selected from the one or more files;
   generating, by the processor, a first hash of a file path of the file; and concatenating, by the processor, the first hash and second hash to form the root dataset identifier.

3. The method of claim 1, further comprising generating a value representing the file number in the root dataset corresponding to the row identifier.

4. The method of claim 1, further comprising generating a value representing a row number in the root dataset corresponding to the row identifier.

5. The method of claim 1, the generating the row identifier further comprising generating an offset map, the offset map defining lengths of the relative file number, relative row number, and relative row count.

6. The method of claim 1, the generating the row identifier further comprising generating, by the processor, a relative stripe number, the relative stripe number identifying a corresponding stripe number in the root dataset.

7. The method of claim 1, the generating the row identifier further comprising:
generating, by the processor, a relative row count; and
generating, by the processor, an input dataset identifier.

8. A non-transitory computer-readable storage medium for tangibly storing computer program instructions capable of being executed by a computer processor, the computer program instructions defining steps of:
reading, by a processor, annotation data, the annotation data comprising a set of rows stored in a first file;
reading, by the processor, a root dataset, the root dataset stored in one or more files separate from the first file;
generating, by the processor, a row identifier for each row in the set of rows, the row identifier storing a plurality of fields representing an alignment of a respective row in the annotation data to a corresponding row in the root dataset, the row identifier comprising a concatenation of a root dataset identifier, a relative file number relative to the root dataset, and a relative row number;
generating, by the processor, an annotation dataset, the annotation dataset comprising the set of rows and corresponding row identifiers; and
writing, by the processor, the annotation dataset to at least one file, the at least one file separate from the one or more files and the first file.

9. The non-transitory computer-readable storage medium of claim 8, the steps further comprising:
generating, by the processor, a first hash of a creation timestamp of a file selected from the one or more files;
generating, by the processor, a first hash of a file path of the file; and
concatenating, by the processor, the first hash and second hash to form the root dataset identifier.

10. The non-transitory computer-readable storage medium of claim 8, the steps further comprising generating a value representing the file number in the root dataset corresponding to the row identifier.

11. The non-transitory computer-readable storage medium of claim 8, the steps further comprising generating a value representing a row number in the root dataset corresponding to the row identifier.

12. The non-transitory computer-readable storage medium of claim 8, the generating the row identifier further comprising generating an offset map, the offset map defining lengths of the relative file number, relative row number, and relative row count.

13. The non-transitory computer-readable storage medium of claim 8, the generating the row identifier further comprising generating, by the processor, a relative stripe number, the relative stripe number identifying a corresponding stripe number in the root dataset.

14. The non-transitory computer-readable storage medium of claim 8, the generating the row identifier further comprising:
generating, by the processor, a relative row count; and
generating, by the processor, an input dataset identifier.

15. An apparatus comprising:
a processor; and
a storage medium for tangibly storing thereon program logic for execution by the processor, the stored program logic causing the processor to perform operations of:
reading annotation data, the annotation data comprising a set of rows stored in a first file;
reading a root dataset, the root dataset stored in one or more files separate from the first file;
generating a row identifier for each row in the set of rows, the row identifier storing a plurality of fields representing an alignment of a respective row in the annotation data to a corresponding row in the root dataset, the row identifier comprising a concatenation of a root dataset identifier, a relative file number relative to the root dataset, and a relative row number;
generating an annotation dataset, the annotation dataset comprising the set of rows and corresponding row identifiers; and
writing the annotation dataset to at least one file, the at least one file separate from the one or more files and the first file.

16. The apparatus of claim 15, the operations further comprising:
generating a first hash of a creation timestamp of a file selected from the one or more files;
generating a first hash of a file path of the file; and
concatenating the first hash and second hash to form the root dataset identifier.

17. The apparatus of claim 15, the generating the row identifier further comprising:
generating an offset map, the offset map defining lengths of the relative file number, relative row number, and relative row count; and
generating a relative stripe number, the relative stripe number identifying a corresponding stripe number in the root dataset.

* * * * *